(12) United States Patent
Lipnizki et al.

(10) Patent No.: US 8,877,920 B2
(45) Date of Patent: Nov. 4, 2014

(54) METHOD AND PLANT FOR PURIFYING A CARBOHYDRATE RICH LIQUID

(75) Inventors: Frank Lipnizki, Lund (SE); Wim Van Der Ham, Lausden (NL); Reiné Van Eldik, Kesteren (NL)

(73) Assignee: Alfa Laval Corporate AB, Lund (SE)

( * ) Notice: Subject to any disclaimer, the term of this patent is extended or adjusted under 35 U.S.C. 154(b) by 122 days.

(21) Appl. No.: 13/379,681

(22) PCT Filed: Jun. 25, 2010

(86) PCT No.: PCT/IB2010/001537
§ 371 (c)(1),
(2), (4) Date: May 22, 2012

(87) PCT Pub. No.: WO2010/150088
PCT Pub. Date: Dec. 29, 2010

(65) Prior Publication Data
US 2012/0226032 A1    Sep. 6, 2012

(30) Foreign Application Priority Data

Jun. 25, 2009  (EP) .................................... 09163807

(51) Int. Cl.
C13K 1/08 (2006.01)
C13B 20/16 (2011.01)
A23L 1/09 (2006.01)

(52) U.S. Cl.
CPC ............. *A23L 1/095* (2013.01); *C13B 20/165* (2013.01); *C13K 1/08* (2013.01)
USPC .......................................... 536/127; 422/187

(58) Field of Classification Search
CPC ......... A23L 1/095; C13K 1/08; C13B 20/165

USPC .......................................... 536/127; 422/187
See application file for complete search history.

(56) References Cited

U.S. PATENT DOCUMENTS

| 4,154,623 A | 5/1979 | Schwengers et al. |
| 5,853,487 A | 12/1998 | Tang et al. |
| 2006/0160190 A1 | 7/2006 | Bruckmayer |

FOREIGN PATENT DOCUMENTS

| WO | WO2005079945 A1 | 9/2005 |
| WO | WO2007090614 A1 | 8/2007 |

OTHER PUBLICATIONS

Singh, N., Cheryan, M., "Properties and composition of concentrates and syrup obtained by microfiltration of Saccharified corn starch hydrolysate", Journal of Cereal Science, 27:315-320 (1998).
Singh, N., Cheryan, M., "Membrane Technology in corn refining and bioproduct-processing", Strach/Starke, 50 (1):16-23 (1998).

*Primary Examiner* — Brandon Fetterolf
*Assistant Examiner* — Yih-Horng Shiao
(74) *Attorney, Agent, or Firm* — Buchanan Ingersoll & Rooney PC

(57) ABSTRACT

Described is a method for preparing a purified liquid containing carbohydrates. The method comprises the steps of: hydrolysing starch to a dextrose equivalent (DE) of 10 or above, thus obtaining a liquid of carbohydrates; removing a heavy weight sludge fraction from the light weight liquid of carbohydrates using centrifugation; filtering the remaining liquid of carbohydrates, the filter being capable of retaining coarser particles while allowing particles with a diameter less than 2 μm to pass; performing membrane separation on the filtered liquid of carbohydrates using a membrane having a pore size at 2 μm or below; and recovering a permeate stream of purified liquid containing carbohydrates. Also disclosed in a plant for performing the method.

11 Claims, 1 Drawing Sheet

METHOD AND PLANT FOR PURIFYING A CARBOHYDRATE RICH LIQUID

The present invention relates to a method and a plant for preparing a purified liquid containing carbohydrates, in particular the present invention relates to a method and a plant for purifying carbohydrates from an initial hydrolysis of starch.

BACKGROUND OF THE INVENTION

Starch is a well-known polysaccharide consisting of a large number of glucose monosaccharide units joined together by glycosidic $\alpha(1,4)$ or $\alpha(1,6)$ bonds. The sources of starch for industry purposes are predominantly agricultural products, e.g. starchy vegetables and cereals such as rice, wheat, maize, cassava, potato etc.

By hydrolysis of starch simpler carbohydrates are obtained, which can be used in the production of e.g. syrup. All poly- and oligosaccharides, which are usually a product of enzymatic and/or acid hydrolysis of starch, are often referred to as dextrins. The product of such a hydrolysis is often described using a DE-value (dextrose equivalent), which is based on the ratio of dextrose to dry-matter. The hydrolysates of starch are available in various grades. Thus at low grade glucose syrup is available with a DE value of 20-25, a normal glucose syrup has a DE value of 43, a maltose syrup has DE value of around 40, and glucose sugar has a DE value of 87-98.

Depending on the source of the starch and the process used for the hydrolysation, a sludge fraction of varying extent may be obtained as part of the product. The state of the art technology for removing said mud fraction from the product is by use of a rotary vacuum filter (RVF) with a diatomaceous earth (kieselguhr) coating. The use of RVF is commonly associated with high investment and high operating costs i.e. high cost for kieselguhr and for disposal of kieselguhr. RVF further introduces a high complexity of the process as well as safety issues with respect to operators. Furthermore, sugar loss in the kieselguhr occurs.

A method for purification using ultrafiltration has been suggested in WO 2005/079945 and U.S. Pat. No. 4,154,623. According to the published international patent application a filtration unit comprising a multiple feed and bleed microfiltration battery and a three-phase-decanter is disclosed. The three-phase-decanter decanter is installed in-between the multiple feed and bleed microfiltration battery and the ultrafiltration unit. Membranes applied in the microfiltration battery are ceramic membranes having filtration layers with a pore size of from 0.050 µm to 0.8 µm. The filtrate from the microfiltration battery is separated in a three-phase decanter into a heavy phase, an intermediate heavy liquid phase and a light phase. The intermediate and the heavy phase is finally treated in an ultrafiltration unit.

According to the U.S. Pat. No. 4,154,623, a starch slurry is liquefied at 85° C. using an $\alpha$-amylase. Subsequently, the liquefied product is saccharificated using a fungal amylase or an amyloglycosidase at about 60° C. The saccharified product is filtered on a micro filter having a pore size of 0.1-0.3 µm, i.e. through a micropore filter. The filtrate is introduced into an ultrafiltration apparatus to provide a permeate stream, which is further processed to a syrup.

The object of the present invention is to provide a method and an apparatus for preparing a purified liquid of carbohydrates at low cost over long production cycles.

SUMMARY OF THE INVENTION

A first aspect of the present invention relates to a method for preparing a purified liquid containing saccharides, comprising the steps of:

a. hydrolysing starch to a dextrose equivalent (DE) of 10 or above, thus obtaining a liquid of carbohydrates,
b. removing a heavy weight sludge fraction from the light weight liquid of carbohydrates using centrifugation,
c. filtering the remaining liquid of carbohydrates, the filter being capable of retaining coarser particles while allowing particles with a diameter less than 2 µm to pass,
d. performing membrane separation on the filtered liquid of carbohydrates using a membrane having a pore size at 2 µm or below, and
e. recovering a permeate stream of purified liquid containing carbohydrates.

After hydrolysation of starch, the resulting stream contains starch hydrolysate, a sludge fraction and optionally a fibre fraction. The sludge fraction comprises non-carbohydrate residues of e.g. enzymes, proteins, lipids etc. The sludge and the optional fibre fraction need to be removed to avoid clogging and obstruction of the flow channels in the membrane unit and to reduce fouling of the membrane. The present invention uses the cooperation of two unit operations to perform the purification of the liquid of carbohydrate, i.e. the use of a centrifugal force to remove the main sludge part and filtering operation to remove coarser particles.

The removal of the sludge fraction prior to filtering allows for the filtration of the fluid of carbohydrates through a simple filter having relatively wide openings before the fluid of carbohydrates is subjected to membrane separation. Since the vast majority of the sludge has been removed the filter is not clogged easily and can served its main purpose, i.e. to separate coarser solid particles that otherwise would impede the membrane separation process. The method of the invention thus provides for long production cycles, as the equipment of the method is not subjected to substantial wear and fouling by the non-carbohydrate components of the feed of hydrolysed starch.

According to the invention the heavy weight sludge fraction is separated from the liquid of carbohydrate by centrifugal force. A two-phase decanter is generally preferred.

The feed may contain certain amount of fibres and other materials insoluble in the feed. These materials will generally tend to collect on the surface of the liquid of carbohydrates during the centrifugation step. According to a preferred aspect of the invention the light weight liquid of carbohydrates is skimmed to remove the floating fibre rich fraction prior to membrane separation step. The removal of the fibre rich fraction reduces fouling of the membrane.

Surprisingly, it has been realized that the decanter may be adjusted to remove the floating part also. Thus, in the event the feed contains constituents rising to the surface in the decanter during the operation, this fraction may be skimmed in the decanter. Thus, a separate unit operation for skimming can be omitted. In a certain aspect of the invention, the sludge fraction and the skimmed fraction exits through the same discharge port.

Following the removal of sludge and optional fibres the hydrolysate undergoes a filtering process to remove coarser particles and remaining fibres. According to the present method the filtering process retains any particles of a certain size to avoid clogging of the flow channels and to reduce fouling of the membrane in the subsequent membrane separation step. The openings of the filter allow finer particles to pass to avoid increased process economic. Suitable the filtering retains particles above a diameter of 250 µm, preferably a diameter above 150 µm. The filter allows particles having a diameter of less than 2 µm, such as less than 10 µm, preferably less than 30 µm, more preferred less than 50 µm to pass. Since a microfiltration membrane possesses pore sizes below 1 µm, microfiltration cannot be used in the filtering step of the present invention. The wider pores of the filter used in the present invention allows for improved process economics compared to the prior art method using microfiltration, ultrafiltration and/or nanofiltration. The openings of the filter are selected having regarded to height of the flow channels of the subsequent ultrafiltration step. Thus, the particles allowed to pass the filter may be larger for membrane units having greater flow channel heights.

The filter used in the filtering step is usually of the dead-end type. Cross-flow microfiltration membranes e.g. arranged in multiple feed and bleed stage have the disadvantages of being technically complicated and difficult to control due to membrane fouling and the need for regeneration of the membranes e.g. by back-flushing or recirculation of CIP liquid. The dead-end filter may comprise two filters working in duplex, i.e. one is regenerated while the other is in operation. Alternatively, the filter may be of the self-cleaning type, such as a piston filter.

The size is described as particle "diameter". In the event the particles of the present invention are not round or spherical, the term refers to the longest dimension of the particle.

After filtering, the membrane separation step separates the stream from the filtering process into a purified starch hydrolysate permeate stream and a starch hydrolysate retentate stream containing non-carbonate residues such as enzymes, proteins, lipids etc., which are retained by the membrane. The choice of membrane defines the purity of the starch hydrolysate after the membrane separation step. To obtain the desired purity the membrane is generally selected as an ultrafiltration membrane having a molecular weight cut-off (MWCO) value between 1,000 D and 200,000 D.

In one of the final stages of the ultrafiltration step, the feed liquid containing carbohydrates may subjected to diafiltration, in which water is added to the solution to assist in transporting the carbohydrates through the ultrafiltration membrane. Generally, an amount of 5% to 20% water is added to the feed stream for the diafiltration.

Following the membrane separation step the starch hydrolysate permeate stream of the purified liquid of saccharides is recovered. In a presently preferred embodiment the starch hydrolysate retentate stream is at least partially recycled from the membrane separation step to either the step of removing the heavy weight sludge (step b) and/or the step of hydrolysing starch (step a) and/or removed from the process as bleed. Recycling said retentate stream to a previous step results in an additional yield and the reduction/absence of a waste effluent stream. In certain embodiments of the invention the recycling is only performed in part to avoid the up concentration of certain undesired residues.

The method of the present invention may further comprise a step of ion exchanging for removing remnant colouring substances from the purified liquid of saccharides. The removal of said remnant colouring substances results in a further increase in the product quality.

In a certain aspect of the invention the method comprises a combination of a two-phase decanting process, an intermediate filtration step and an ultrafiltration membrane separation step. The combination results in a high colour removal from the liquid of carbohydrates. The high degree of colour removal results in a lesser load on the subsequent optional ion-exchange unit. Since the ion-exchange process operates with longer production cycles, the overall production capacity is increased due to said combination.

Removal of the sludge fraction is not limited to step b and may be carried out before the hydrolysation of the starch or between liquidification and saccharification. In a preferred embodiment, however, the sludge fraction is removed after hydrolysation of starch.

The present invention also relates to a plant for purifying a liquid of saccharides, comprising
- a device for hydrolysation of starch to obtain a liquid of carbohydrates,
- a separator unit capable of removing a sludge fraction from the liquid of carbohydrates,
- a filter unit comprising a filter allowing particles with a diameter less than 2 µm to pass, and
- a membrane unit receiving the filtered liquid of carbohydrates and comprising a membrane having a pore size at 2 µm or below separating the liquid of carbohydrates into a permeate and a retentate.

The device for hydrolysation of starch generally comprises one or more stirred containers and dispensers for adding enzymes and/or acids/bases. The specific selection of hydrolysation equipment is of minor importance for the present invention.

The separator unit capable of separating the sludge fraction from the liquid of carbohydrates may be a centrifugal decanter or a high speed separator. In a preferred embodiment of the present invention a two-phase centrifugal decanter is used. The decanter is preferred as pairing discs can be installed to skim the floating fibre rich fraction.

The filter unit serves as pre-treatment to the membrane unit by removing coarser particles from the stream, which would otherwise affect the performance of the membrane unit negatively. In a preferred embodiment of the present invention the filter unit is a strainer. The filter in the filter unit retains coarser particles, e.g. above 250 µm in diameter, preferably above 150 µm. The filter contains openings that allow minor particles to pass. Particles having a diameter of 2 µm or less, such as 10 µm or less, preferably 50 µm or less are allowed to pass to the succeeding membrane unit. Suitably, the filter unit is of the continuous type, in which the filter may be emptied or regenerated without stopping the process. Examples of the continuous type filters are duplex filters and self-cleaning filters.

The membrane unit may be any membrane unit suitable for the purpose, e.g. a spiral wounded membrane module or a hollow fibre module. In a preferred embodiment the membrane unit is a spiral wounded membrane module. The spiral wounded membrane module preferably comprises a spacer net for defining the feed flow channel and distributing the feed. The mesh layer has a physical appearance that separates the membranes throughout the entire membrane area while allowing the fluid to stream relatively unimpeded. The spacer net may have a thickness of 20 mil (0.51 mm) to 200 mil (5.1 mm). The term "mil" is defined as 1 mil=$\frac{1}{1000}$ inch.

In a preferred embodiment the spiral wounded membrane module comprises an ultrafiltration membrane. In another preferred embodiment the ultrafiltration membrane has a molecular weight cut-off (MWCO) value between 1 kD and 200 kD, preferably around 100 kD.

In an alternative embodiment the spiral wounded membrane module comprises a microfiltration membrane. In this embodiment the microfiltration membrane has an average pore diameter between 0.05 and 2 µm. When microfiltration is used less discoloration of the starch hydrolysate permeate stream occurs, which may be acceptable in certain applications.

In a preferred embodiment the membranes can be regenerated periodically. Thus, ensuring an unimpeded stream through the membranes results in a continuous production and reduces the required size of the membrane unit.

The present invention also relates to the use of a filter unit for performing a pre-treatment of a desludged liquid of carbohydrates prior to treatment in a membrane unit comprising a membrane having a pore size at 2 µm or below, said filter unit being capable of retaining coarser particles from the desludged liquid of carbohydrates while allowing particles of a diameter less than 2 µm to pass.

FIGURES

DETAILED DESCRIPTION OF THE INVENTION

Figure 1:
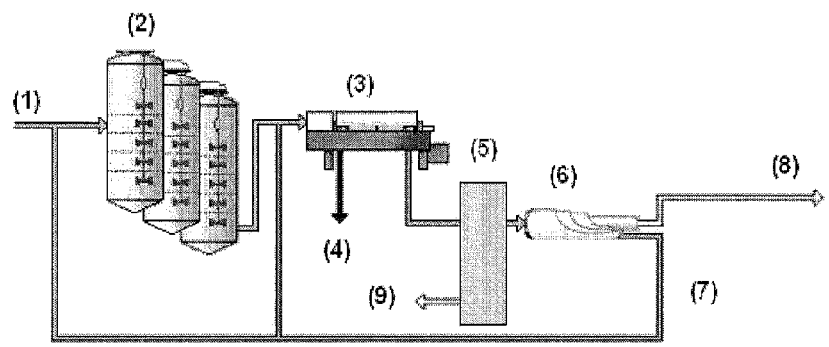
FIG. 1 is an illustration of an embodiment of the plant of the present invention.

FIG. 1 shows the flow sheet of an embodiment for the method of the invention. The stream 1 arrives from a not shown liquidification process in which starch has been subjected to a treatment with an acid or enzymes. Stream 1 enters the stirred containers 2 for the saccharification process to occur. The starch having been hydrolysed by liquidification and saccharification is subsequently introduced into a decanter 3 to separate a sludge part 4 from a stream of carbohydrates. The desludged liquid of carbohydrates is conveyed to a strainer 5 for removing coarser particles before the stream is entered into the spiral wounded membrane module 6. The stream is separated in the membrane module into a retentate stream 7, which is recycled entirely to the inlet of the decanter and/or the inlet of the saccharification containers and/or removed from the process as a bleed. The permeate 8 is collected and optionally further purified and/or concentrated. The coarser particles retained by the filter is discharged with stream 9.

The present invention is not limited regarding the origin of the starch. Thus the starch for use in the above-mentioned method may be obtained from starchy vegetables such as potatoes or cassava; or cereals such as rice, wheat, maize, etc.

Hydrolysis of starch to a DE-value of 10 or above generally requires an initial starch liquidification and subsequent saccharification of the liquidified starch. However, hydrolysis may be performed in a single step using enzymes or acid. Enzymes suitable for enzymatic hydrolysis of a starch slurry are generally selected from the group comprising α-Amylase, β-Amylase and glucoamylase (γ-Amylase). Preferably the starch is hydrolysed to a DE-value of 40 or above, most preferably the starch is hydrolysed to a DE-value of 60 or above. The term "DE-value" in the present application is defined as the percentage of the total solids by mass that have been converted to reducing sugars.

When acid is used for the liquidification step, an initial DE-value of up to about 10-15 may be obtained. However, for high DE-values it may be desired to use α-amylase for the initial liquidification. Optionally, a combination of acid and enzymes are used for the liquidification step. The saccharification step is generally performed using an amyloglucosidase. The present invention is not sensitive to the specific method used for manufacturing of the hydrolysate; therefore, any method suitable for hydrolysation may be used.

The liquid of carbohydrates resulting from the hydrolysation process is subjected to a centrifugal force to separate the heavy weight sludge fraction from the lighter weight carbohydrate solution. Several methods are available, such as a gravity decanter, centrifugal decanter and a high speed separator.

The centrifugal decanter may be selected among two-phase and three-phase decanters.

Figure 2:
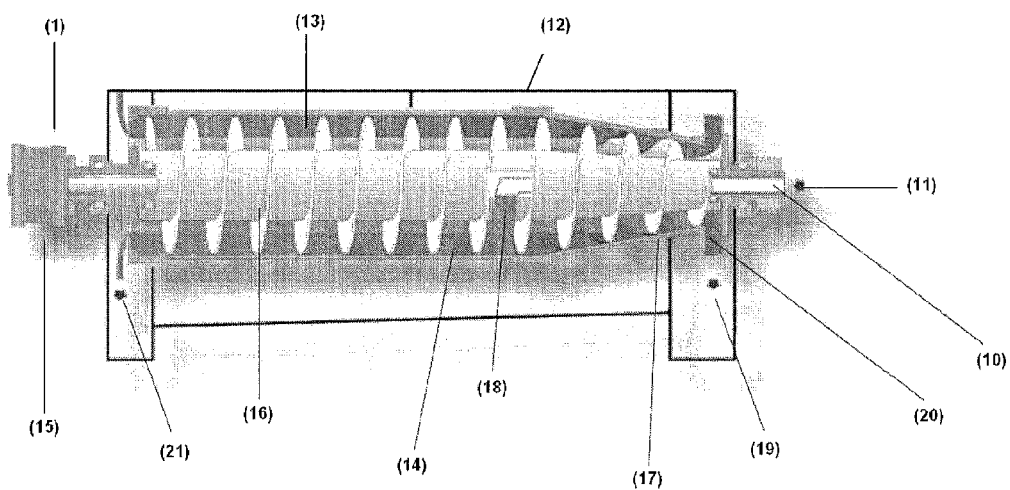
FIG. 2 is an illustration of an embodiment of a two-phase centrifugal decanter.

In FIG. 2 a decanter centrifuge 1 is presented. It comprises a casing 12 including a cylindrical bowl 13 enclosed by walls 14. An external gearbox 15 for controlling the rotational speed of a screw conveyor 16 is connected adjacent to the casing 12. Separation takes place in the cylindrical bowl 13. A product feed 11 is fed into the cylindrical bowl 13 through a stationary inlet tube 10 in a conical end 17 of the cylindrical bowl 13 and is distributed in the bowl 13 via an inlet distributor 18. Centrifugal force makes the sludge of the feed build up on the wall of the bowl. The sludge 19 leave the bowl through a discharge opening port 20. Separation takes place throughout the entire length of the cylindrical part of the bowl, and the clarified carbohydrate solution leaves the bowl by flowing over adjustable plate dams into the casing. The carbohydrate solution leaves the bowl through an outlet 21.

The decanter may be provided with pairing discs that prevent a floating fraction to enter into the carbohydrate stream. The floating fraction is guided to the discharge opening port 20 and exits the decanter together with the sludge fraction.

The decanters usually have a maximum G force above 1000 G to secure a fast separation of the sludge from the carbohydrate solution. The sludge may be separated in a heavy weight fraction having a density of 1.1-1.6 kg/dm$^3$. The capacity of the decanter may be in the range of 8 to 55 m$^3$/h, depending on the type selected.

Prior to treatment by a filtering device, such as a strainer, the decanted product is usually stored in a buffering tank. The decanted product is pumped to the strainer capable of retaining coarser particles. The mesh of the filter in the strainer is selected dependent on the membrane unit. Thus, as a rule of thumb the particles passing the strainer should have a diameter of ½₀ or less of the channel height of the flow channels of the subsequent membrane module. Hereby it is secured that the particles will not clog the membrane unit and thus decreasing the efficiency and life time. Usually, the particles passing the strainer should not exceed 250 µm. Suitably, the particles passing the strainer are of a size of 10 µm or less, such as 50 µm or less. It has proven useful to retain particles of about 100 µm and more in the strainer. In some embodiments particles of about 80 µm and more are retained in the strainer.

The mesh of the strainer consists of a semi-permeable barrier made of connected strands of metal, fibre, or other flexible/ductile material. The mesh may be of any suitable type. A suitable example includes a plastic mesh, which may be extruded, oriented, expanded or tubular. Plastic mesh can be made from polypropylene, polyethylene, nylon, PVC or PTFE. Another example is a metal mesh, which can be woven, welded, expanded, photo-chemically etched or electroformed (screen filter) from steel or other metals. The mesh may also be a cloth, i.e. a loosely woven fabric that has a large number of closely-spaced holes.

A duplex filter may be used for uninterrupted processing. A duplex filter comprises two filters connected in parallel through a changeover device. One of the filters may be regenerated while the other is in operation.

Another option for the filtering step is the application of a self-cleaning piston filter. The piston filter is installed in the feed stream and is operated by intermittently moving the piston to scrape particles on the filter off and collect the particles in the bottom of the filter. The collected particles may be removed through a valve when the piston is pressed down.

The filtered carbohydrate solution may be stored in a buffering tank before entering the membrane unit. A feed pump pumps the carbohydrate solution to the membrane unit to contact the solution with the membrane. The membrane permit salts, water and carbohydrates below a certain size to pass into the permeate stream, while the proteins, gums, etc. are rejected and thus become increasingly concentrated in the retentate steam. The recirculation pump system provides the membranes with the cross-flow rate that is appropriate for keeping fouling to the minimum, balanced against the overall capacity of the system. The unit may contain a cooling system for removing any heat generated by the pumps. The permeate collected from the membrane unit usually enters the permeate tank system before it is further purified and concentrated. The retentate flow rate output is normally controlled by a flow ratio system—the so-called Volumetric Concentration Factor (VCF) value—or by an optional refractometer/density in-line instrument to obtain the desired product concentration or volume reduction.

The retentate may be discharged or may be recycled to the saccharification stage. Usually, at least a part of retentate, preferably the entire amount, is recycled to the saccharification stage. The recycling ensures utility of essentially the entire amount of carbohydrates in the feed. Furthermore, the load on the environment is reduced.

The membrane unit may be selected among a variety of devices available on the market. Microfiltration membranes have a pore diameter of 0.05-2 µm, while ultrafiltration membranes have a MWCO value of 1,000-1,000,000 Da. Microfiltration may be used if impurities in the product can be accepted. However, generally ultrafiltration is used to obtain a high purity product.

Suitable membrane units include plate-and-frame, spiral-wound and hollow-fibre modules, the latter two being preferred. In a spiral wound membrane unit the membrane is folded over a porous spacer sheet, through which product drains. A spacer net is placed in top to form the feed channel and to serve as a feed distributor. The sandwich is rolled in a spiral around a small perforated drain pipe. The module is inserted in a pressure vessel. A plurality of units may be installed in parallel and in series. The membrane may be of the microfiltration or ultrafiltration type.

Hollow fibre modules contain a number of porous fibres surrounded by a closed vessel. The solution to be treated is introduced to the closed vessel or in the alternative through openings of the fibres. Components small enough to pass the porous hollow fibre is gained in the permeate stream in the cavity of the hollow fibres or alternatively in the closed vessel.

Spiral wounded membrane modules are generally preferred due to process economics and reliability. The membranes may be made of polymers, such as polysulfone, polyethersulfone, polyvinylidene fluoride, polyamide-imide etc. The screen or support layer serving to distribute the feed is generally a mesh providing flow channels for feed. The commercially available mesh layers are obtainable in the following sizes: 28 mil (0.71 mm), 48 mil (1.22 mm), 80 mil (2.03 mm), and 106 mil (2.69 mm). By way of example a filter allowing particles of 10 µm or less to pass while excluding larger particles would be suitable for a spiral wounded membrane unit that uses a screen or support layer of 28 mill. A filter allowing particles of 100 µm or less to pass, while retaining larger particles would be suitable for spiral wounded membrane unit that uses a screen or support layer of 80 mil.

At present, 80 mil is preferred. To provide for at cost-effective production and a minimal hold-up volume a suitable ultrafiltration system is a cross-flow system designed for automatically controlled continuous product concentration. CIP (Cleaning In Place) is usually used to allow for easy regeneration of the membranes.

A suitable system would consists of at least one but ideally two or more cross-flow ultrafiltration membrane filtration units in parallel, which ensures that at least one unit is in production mode, while a second unit is either in production or cleaning mode. Generally a spiral element with of GR40PP membrane is preferred. Specifically suitable hydrolysate for this type of membrane modules are purified corn starch hydrolysate type DE 40-50. Operating temperature is typically 75° C. with an operation feed pressure of approximately 4-5 bar. The product flow feed may be between 25 and 40 $m^3/h$ providing a typical retentate flow rate of 2 to 7 $m^3/h$ and a permeate flow rate of 15 to 25 $m^3/h$.

In the later or last stage of the ultrafiltration process it is an advantage to add water to the feed in order to increase the amount of hydrocarbon compounds in the permeate. The dilution of the feed result in a lower osmotic difference between the retentate and the permeate. The amount of added water is generally balanced with the need for removing the water again after filtration. Usually, about 5% to 20% of dialysis water is added to the feed.

The carbohydrate permeate may be further processed by ion exchange in order to remove the colouring substances. Typical ion exchangers are ion exchange resins (functionalized porous or gel polymer), zeolites, montmorillonite, clay, and soil humus. An ion-exchange resin is an insoluble matrix (or support structure) normally in the form of small (1-2 mm diameter) beads, usually white or yellowish, fabricated from an organic polymer substrate. The material has highly developed structure of pores on the surface. The pores functions as sites that easily traps and releases ions. The trapping of ions takes place only with simultaneous releasing of other ions; thus the process is called ion-exchange. There are multiple different types of ion-exchange resins, which are fabricated to selectively prefer one or several different types of ions. A typical ion-exchange resin is based on cross-linked polystyrene.

EXAMPLE 1

Purification of a Carbohydrate Solution

A carbohydrate solution having a DE value of 95 was treated by the method according to the invention. The stream of carbohydrates had a dry matter content of 28-33% by weight, a sludge part of 0.3 to 0.4% by weight, a nitrogen content of 350 ppm, and a fat content of 0.21% by weight. The clarity of the carbohydrate solution was measured to >200 NTU.

The carbohydrate solution was fed into a two phase decanter (STNX 438 available from Alfa Laval). The decanter separated the sludge portion (heavy phase) of the remainder of the carbohydrate solution (light phase). The sludge had DS value of 65-70% and a Brix value of approximately 10, i.e. the decanter cake contained 10% by weight of carbohydrate.

The desludged carbohydrate solution was treated in a strainer. The strainer contained a mesh retaining particles of 100 µm and above. The filtered carbohydrate solution was fed into a membrane filtration system with spiral wound elements using the membrane type GR40PP.

The permeate was recovered. The dry matter content was 27-32% by weight, the sludge fraction was essentially absent, the nitrogen content was reduced to 60 ppm, the fat content was below 0.01% by weight, the clarity was improved to 0.8 NTU and the colour reduction was reduced by 50%. Typical values for the prior art RVF method are reduction of the nitrogen content to about 200 ppm, a fat content of about 0.1% by weight, a clarity reduction to 3-10 NTU and a colour reduction of 10%. Moreover, the Brix of the RVF cake is approximately 15.

EXAMPLE 2

Purification Using Diafiltration Water

The product stream of the hydrolysis process comprised 13.65 m$^3$/h carbohydrate, 0.182 m$^3$/h mud and 31.668 m$^3$/h water. In a two-phase decanter 95% of the mud was removed. Only 7% (v/v)| of the mud consisted of carbohydrates, corresponding to a loss of 0.02 m$^3$/h carbohydrates in the mud. The heavy phase of the decanter, which corresponds to a volume stream of 54.23 m$^3$/h was filtered in a strainer of the piston type and entered into an ultrafiltration apparatus. In the last stage of the ultrafiltration an amount of 4 m$^3$/h diafiltration water was added to the feed. The product flow from the ultrafiltration process, i.e. the permeate, was 48.226 m$^3$/h and contained 28% (v/v) carbohydrate. The retentate stream (9 m$^3$/h) was recycled and mixed with the product stream from the hydrolysis stream prior to entering into the decanter.

The invention claimed is:

1. A method for preparing a purified liquid containing carbohydrates, comprising the steps of:
   a) hydrolysing carbohydrates to a dextrose equivalent (DE) of 10 or above, thus obtaining a liquid of carbohydrates,
   b) removing a heavy weight sludge fraction from a light weight liquid of carbohydrates using centrifugation,
   c) filtering the remaining liquid of carbohydrates using a filter, the filter being capable of retaining coarser particles while allowing particles with a diameter of 2 μm to pass wherein the opening of the filter is selected according to a height of a flow channel of a membrane used in the subsequent step,
   d) performing membrane separation on the filtered liquid of carbohydrates using the membrane wherein the membrane has a pore size at 2 μm or below, and
   e) recovering a permeate stream of purified liquid containing carbohydrates.

2. The method according to claim 1, wherein the filtering allows the passing of particles having a diameter of 50 μm.

3. The method according to claim 1 or 2, wherein the filtering retains particles having a diameter above 250 μm.

4. The method according to claim 1 or 2, further comprising at least partially recycling of a retentate from the membrane separation (step d) to either the step of removing the sludge fraction (step b) and/or the step of hydrolysing starch (step a).

5. The method according to claim 1 or 2, wherein the membrane is an ultrafiltration membrane having a molecular weight cut-off (MWCO) value between 1,000 Da and 200,000 Da.

6. The method according to claim 1 or 2, wherein the removing of the heavy weight sludge fraction from the light weight liquid of carbohydrates is performed by a centrifugal decanter.

7. The method according to claim 1 or 2, wherein the light weight liquid of carbohydrates comprising a floating fibre rich fraction is skimmed to remove the floating fibre rich fraction prior to the membrane separation step.

8. The method according to claim 7, wherein the skimming step is performed in a centrifugal decanter.

9. The method according to claim 5, wherein water is added as a feed liquid in one of the final stages of ultrafiltration step.

10. The method according to claim 9, wherein the amount of added water is 5% to 20% by weight of the feed liquid entering the membrane separation unit.

11. The method according to claim 1, wherein the carbohydrates include a starch.

* * * * *